United States Patent
Jugel et al.

(10) Patent No.: US 10,528,592 B2
(45) Date of Patent: Jan. 7, 2020

(54) DATABASE SCALING FOR MULTI-TENANT APPLICATIONS

(71) Applicant: SAP SE, Walldorf (DE)

(72) Inventors: Kay Jugel, Dresden (DE); Axel Schroeder, Dresden (DE); Christof Momm, Dresden (DE); Martin Knechtel, Dresden (DE)

(73) Assignee: SAP SE, Walldorf (DE)

( * ) Notice: Subject to any disclaimer, the term of this patent is extended or adjusted under 35 U.S.C. 154(b) by 203 days.

(21) Appl. No.: 15/861,857

(22) Filed: Jan. 4, 2018

(65) Prior Publication Data

US 2019/0205455 A1    Jul. 4, 2019

(51) Int. Cl.
*G06F 16/27* (2019.01)
*G06F 16/21* (2019.01)
*G06F 16/24* (2019.01)
*G06F 16/23* (2019.01)

(52) U.S. Cl.
CPC ............ *G06F 16/27* (2019.01); *G06F 16/21* (2019.01); *G06F 16/2365* (2019.01); *G06F 16/24* (2019.01)

(58) Field of Classification Search
CPC .......... G06F 16/27; G06F 16/21; G06F 16/24; G06F 16/2365
USPC ........................................................ 707/609
See application file for complete search history.

(56) References Cited

U.S. PATENT DOCUMENTS

| 8,200,705 | B2* | 6/2012 | Wang ................. G06F 16/2282 707/796 |
| 8,381,285 | B2 | 2/2013 | Dau et al. |
| 8,386,501 | B2* | 2/2013 | Cahill ..................... G06F 16/27 707/756 |
| 8,615,631 | B2 | 12/2013 | Schroeder et al. |
| 8,615,639 | B2 | 12/2013 | Schroeder et al. |
| 8,875,122 | B2* | 10/2014 | Driesen ..................... G06F 8/65 717/168 |
| 8,990,166 | B2 | 3/2015 | Thomsen et al. |
| 9,053,162 | B2* | 6/2015 | Shutt ....................... G06F 16/27 |
| 9,116,627 | B2 | 8/2015 | Thomsen et al. |

(Continued)

OTHER PUBLICATIONS

Moreira, Leonardo O., et al., "Towards Improvements on the Quality of Service for Multi-Tenant RDBMS in the Cloud", ICDEW 2014, Chicago, IL, Mar. 31-Apr. 4, 2014, pp. 162-169.*

(Continued)

*Primary Examiner* — Robert Stevens
(74) *Attorney, Agent, or Firm* — Fish & Richardson P.C.

(57) ABSTRACT

The present disclosure involves systems, software, and computer implemented methods for database scaling for multi-tenant applications. One example method includes receiving an indication to migrate a tenant of an application from a default database to a scale database. The tenant is locked. At least one stateful component that includes state information for the tenant is identified. The state information is serialized. The identified stateful component(s) are shut down. Data for the tenant is copied from the default database to the scale database. The tenant is assigned to the scale database. The serialized state information is de-serialized to generate de-serialized state information, and the de-serialized state information is stored in the scale database. The stateful component(s) are restarted and the tenant is unlocked.

20 Claims, 5 Drawing Sheets

(56) References Cited

U.S. PATENT DOCUMENTS

| | | | |
|---|---|---|---|
| 9,208,188 B2* | 12/2015 | Ott | G06F 16/27 |
| 9,270,546 B2* | 2/2016 | Lehmann | G06F 16/252 |
| 9,354,988 B2 | 5/2016 | Schroeder et al. | |
| 10,067,979 B2* | 9/2018 | Agrawal | H05K 999/99 |
| 10,110,506 B2* | 10/2018 | Kasso | H04L 47/741 |
| 10,387,041 B2* | 8/2019 | Nguyen | |
| 2010/0262632 A1* | 10/2010 | Jain | G06F 16/258 |
| | | | 707/809 |
| 2013/0159339 A1 | 6/2013 | Thomsen et al. | |
| 2013/0159344 A1* | 6/2013 | Cahill | G06F 16/27 |
| | | | 707/770 |
| 2013/0194271 A1 | 8/2013 | Roesch et al. | |
| 2014/0059232 A1* | 2/2014 | Plattner | H04L 67/1029 |
| | | | 709/226 |
| 2015/0089066 A1* | 3/2015 | Meswani | H04L 47/741 |
| | | | 709/226 |
| 2018/0139101 A1* | 5/2018 | Puri | H04L 41/12 |
| 2018/0191721 A1* | 7/2018 | Freyensee | H04L 63/10 |
| 2018/0341768 A1* | 11/2018 | Marshall | G06F 21/53 |
| 2018/0373708 A1* | 12/2018 | Martin | G06F 16/214 |

OTHER PUBLICATIONS

Koziolek, Heiko, "The SPOSAD Architectural Style for Multi-tenant Software Applications", WICSA 2011, Boulder, CO, Jun. 20-24, 2011, pp. 320-327.*

Schaffner, Jan, et al., "Predicting In-Memory Database Performance for Automating Cluster Management Tasks", ICDE 2011, Hannover, Germany, Apr. 11-16, 2011, pp. 1264-1275.*

* cited by examiner

US 10,528,592 B2

DATABASE SCALING FOR MULTI-TENANT APPLICATIONS

TECHNICAL FIELD

The present disclosure relates to computer-implemented methods, software, and systems for database scaling for multi-tenant applications.

BACKGROUND

A multitenancy software architecture can include a single instance of a software application that runs on a server and serves multiple tenants. A tenant is a group of users who share a common access to the software instance. In a multitenant architecture, the software application can be designed to provide every tenant a dedicated share of the instance, including tenant-specific data, tenant-specific configurations, tenant-specific user management, and tenant-specific functionality. Multitenancy can be used in cloud computing.

SUMMARY

The present disclosure involves systems, software, and computer implemented methods for database scaling for multi-tenant applications. One example method includes receiving an indication to migrate a tenant of an application from a default database to a scale database. The tenant is locked. At least one stateful component that includes state information for the tenant is identified. The state information is serialized. The identified stateful component(s) are shut down. Data for the tenant is copied from the default database to the scale database. The tenant is assigned to the scale database. The serialized state information is de-serialized to generate de-serialized state information, and the de-serialized state information is stored in the scale database. The stateful component(s) are restarted and the tenant is unlocked.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Cloud applications can be designed to be scalable to handle increasing usage. Options for scalability include horizontal process and database (DB) scaling, e.g., using more DB systems and/or processes in parallel. During default deployment, all tenants can be assigned to a same shared, default process and stored in a same shared, default DB. Tenants can be isolated by a discriminator column in the shared DB, so that a given tenant does not see data of another tenant.

On demand, selected tenants (e.g. those with the highest load, or with a load surpassing a static or dynamic threshold) can be moved to a new scale process and/or to a new scale DB. For example, a most active tenant can be scaled to a new scale process in response to determining, for example, that the default process has incurred greater than fifty percent processor usage for a particular period of time (e.g., fifteen minutes). As another example, a tenant that uses the most data in the default database can be migrated to a scale database in response to determining, for example, that the default database is greater than, for example, seventy percent full. Other examples are described below. A tenant can be treated as an atomic unit, and migrated completely to the new scale database. For example, if a DB system becomes slower due to growing user data, tenant data for one or more tenants can be migrated into one or more other DB systems. Scaling can be performed in the background, hidden from users. Scaling can result in potentially improved performance for all tenants, including those tenants who have been migrated to a scale database or scale process and those tenants who remain with a scale database or scale process.

Data is migrated without any data loss. In some implementations, the cloud application remains online during migration, with zero downtime (e.g., users of the cloud application are not aware that a migration is being performed as the cloud application continues executing during the migration). While migrating, application instances may not be allowed to change the DB being migrated, in order to prevent introduction of data inconsistencies. For example, an application can include a production rule system with timed events that can trigger DB changes at any time. The production rule system can be suspended during migration to prevent in-migration database changes. Other migration variants can include an approach in which clients are offline and queue requests while a server performs a less resource consuming migration as compared to a variant where clients remain online. An administrator can select a most suitable migration variant.

Figure 1:
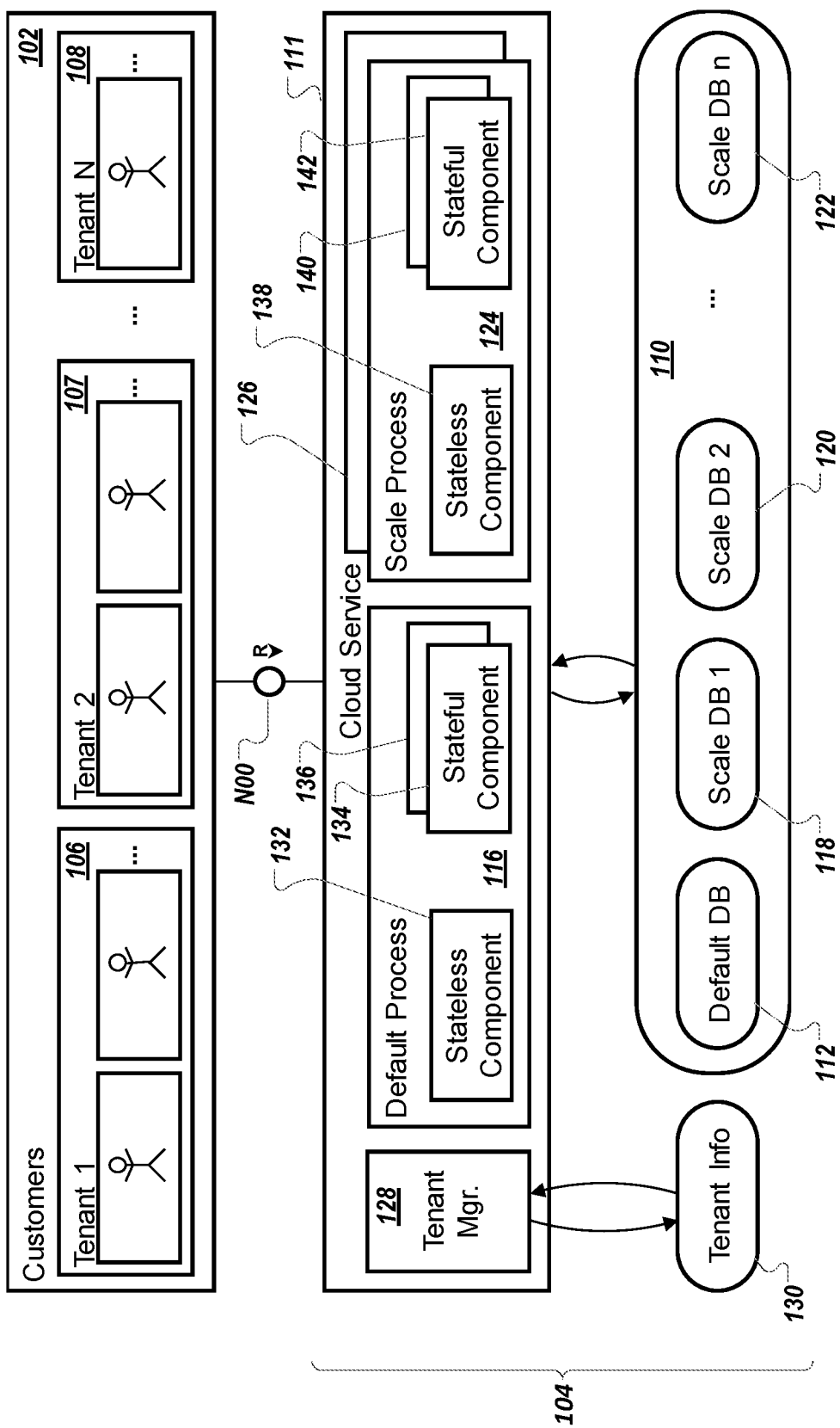
FIGS. 1 and 2 are each block diagrams illustrating example systems for migrating a tenant to a new database.

FIG. 1 is a block diagram illustrating an example system 100 for migrating a tenant to a new database. Customers 102 of a cloud service 104 include (as examples) tenants 106, 107, and 108, respectively. The cloud service 104 includes a scalable storage layer 110 and a scalable processing layer 111.

An example cloud service 104 is a gamification service. The gamification service can providing gaming concepts to other types of applications (e.g., enterprise applications). For example, the gamification service can enable applications to add features such as users being able to earn points for various interactions (e.g., posting to forums, etc.), the display of user leaderboards, etc. Other example gamification concepts are discussed below.

The tenants 106, 107, and 108 can each be initially assigned to a default database 112 in the database layer 110 and a default process 116 in the processing layer 111. While assigned to the default process 116, API (Application Programming Interface) calls received for a tenant are served by the default process 116. While assigned to the default database 112, tenant-specific data for a particular tenant can be stored in the default database 112. Some tenants may stay assigned to the default database. For example, a given tenant may use less than a threshold amount of data (e.g., where the threshold may be either an absolute size or a relative percentage of data stored in the system 100) and/or less than a threshold amount of processing load (e.g., where the threshold amount of processing load may be an absolute amount or a relative percentage of processing compared to tenant processing as a whole).

As described below, some tenants can be later assigned to a scale database 118, 120, or 122, and/or a scale process 124 or 126, due to growth in database size and/or processing load for the cloud service 104. As another example, a tenant can be reassigned to a database and/or a process located in a new datacenter that is in a different location than a current datacenter used for a currently assigned database and/or process. For example, a new datacenter can be established in a new location to more efficiently serve tenants that are proximate to that location. A tenant manager 128 keeps track of assigning tenants to processes and databases. For example, the tenant manager 128 can maintain a tenant information data store 130. The tenant information data store 130 can be stored in the default database 112, or in a different and/or physically or logically remote location, such as a separate tenant information database.

The tenant information data store 130 can be or include a mapping table that includes an entry for each tenant which indicates which database currently stores data for the tenant. For example, data for the tenant 106 may be stored, at a given point in time, in the default database, data for the tenant 107 may be stored in the scale database 118, and data for the tenant 108 may be stored in the scale database 120. The default database 112 and each of the scale databases 118, 120, and 122 can store data for one or more tenants. The tenant manager 128 can provide a set of APIs that can provide services for data source binding management, tenant management and discovery, and tenant migration.

As described in more detail below, the tenant manager 128 can receive an indication (e.g., from an administrator or an automated process) to scale a particular tenant, to a new database, a new process, or both a new database and a new process. For example, the tenant 106 may not use a relatively significant amount of processing, but may use, at a particular point in time, more than a threshold amount (e.g., absolute, relative amount) of data storage (e.g., the tenant 106 may be a gamification tenant that uses images for players, with the storage size of the images resulting in data usage for the tenant exceeding the threshold). The tenant 106 can, for example, be migrated to and assigned to the scale database 118 (while still being assigned to the default process 116). Updated assignment information can be stored for the tenant 106 in the tenant information data store 130.

As another example, the tenant 107 may not use a lot of data storage, but may use, at a particular point in time, more than a threshold amount (e.g., absolute, relative amount) of processing (e.g., the tenant 107 may be a gamification tenant configured with a complex rule set that results in a quantity of generated event messages that causes the processing load for the tenant 108 to exceed the threshold). The tenant 107 can be migrated, for example, to the scale process 124 (while still being assigned to the default database 112). Updated assignment information can be stored for the tenant 107 in the tenant information data store 130. In some implementations, the tenant information data store 130 includes database assignment information, but not process assignment information (e.g., process assignment may be managed by a framework component (not shown).

As yet another example, the tenant 108 may, at a particular point in time, use both more than a threshold amount of data and a threshold amount of processing (e.g., the tenant 108 may be a gamification tenant that uses both image files and a complex rule set). The tenant 108 can be migrated, for example, to the scale database 120 and to the scale process 126. Updated assignment information can be stored for the tenant 108 in the tenant information data store 130.

A process can run stateless and/or stateful application components. For example, the default process 116 includes a stateless component 134 and stateful components 136 and 138. The scale process 124 includes a stateless component 140 and stateful components 142 and 144.

A stateless component is a component that does not manage state information for tenants. A stateless component can have one instance per process, with the one instance being used for multiple tenants if multiple tenants are served by the process. An example of a stateless component is a component that provides services such as retrieval of player information.

A stateful component is a component for which state may be generated for each tenant. In some examples, a stateful component can be more fine-grained. For example, in some implementations, a tenant may have multiple applications and a stateful component instance can be created for each application, for each tenant. An instance of a stateful component can be created in a process for each tenant served by the process. An example of a stateful component is a production rule system that evaluates events, time windows, conditions, and pre-conditions, grants points to players, etc. The stateful component can maintain state for users between events. As described below, stateful components can be managed, during migration, to ensure consistency and transfer of state information.

During an application lifecycle, a database schema for the application may be updated. The tenant manager 128 (or another component) can migrate schemas in various databases in a particular order, to maintain data consistency and ensure that data is not lost. For example, the schema of the tenant information data store 130 can be migrated first (if the tenant information data store 130 is not part of the default database 112). The default database 112 and the scale databases 118, 120, and 122 can be migrated next, in parallel, using, for example, one thread per database. The multiple threads can be joined together, to ensure all threads have been completed, before application access is allowed post migration.

Figure 2:
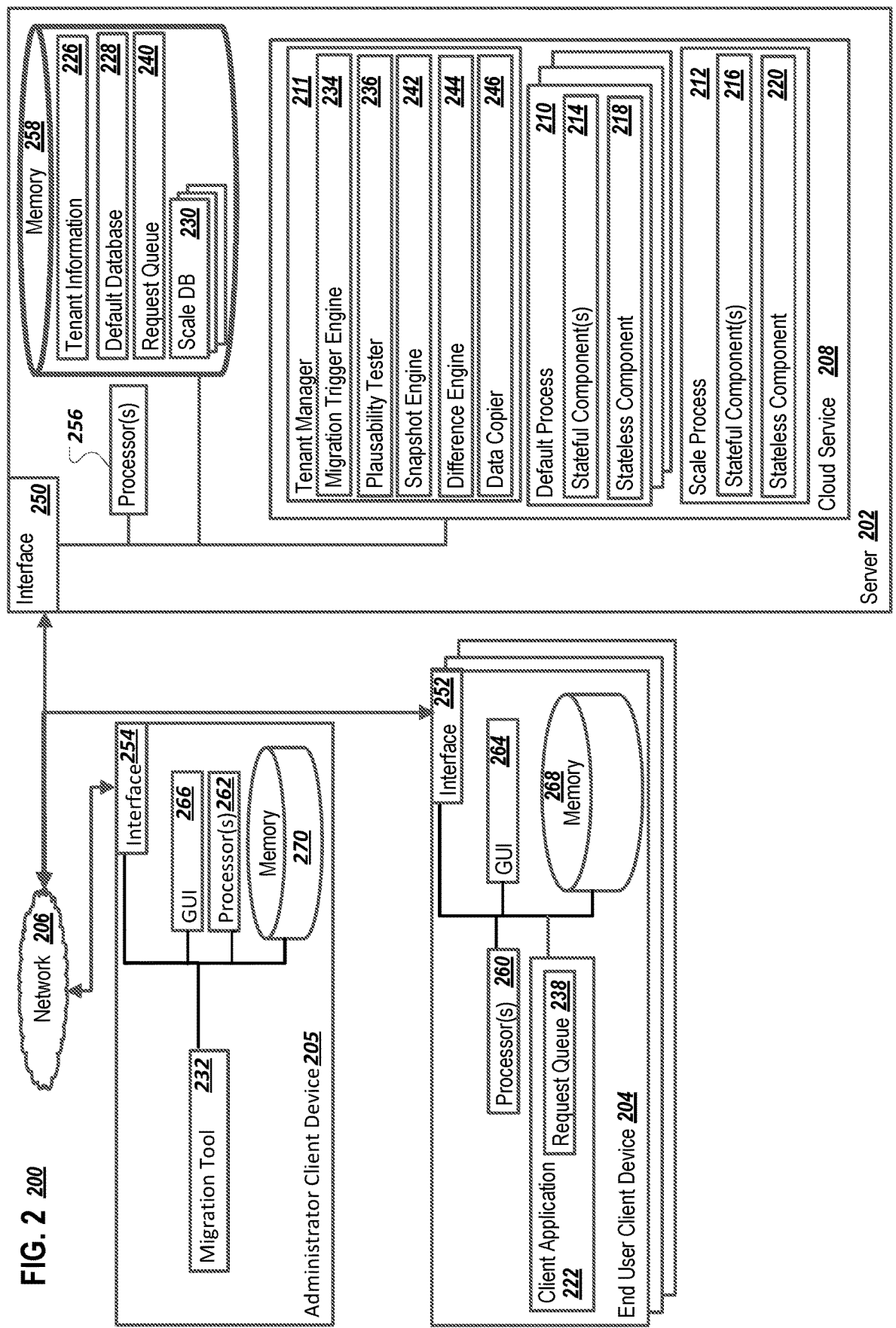

FIG. 2 is a block diagram illustrating an example system 200 for migrating a tenant to a new database. Specifically, the illustrated system 200 includes or is communicably coupled with a server 202, an end-user client device 204, an administrator client device 205, and a network 206. Although shown separately, in some implementations, functionality of two or more systems or servers may be provided by a single system or server. In some implementations, the functionality of one illustrated system or server may be provided by multiple systems or servers.

A cloud service 208 provided by the server 202 can serve multiple tenants. The cloud service 208 can include or be associated with a default process 210 to which tenants are initially assigned, and one or more scale processes, such as a scale process 212, to which tenants can be migrated. A tenant manager 211 (or some other underlying component) can manage which processes are used for which tenants. The default process 210 and the scale process 212 can include stateful component(s) 214 or 216, respectively, that manage state for tenants. The default process 210 and the scale process 212 can also include a stateless component 218 or 220, respectively.

A user of a particular tenant can use a client application 222 on the client computing device 104. The client application 222 can send a request to the cloud service 208 that results in creation, modification, deletion, or retrieval of tenant data. The cloud service 208 can implement scalability, to have different tenants served by different databases and/or processes, or to handle growth in data and/or processing requirements of tenants over time. As tenant requirements grow (e.g., relative to the available resources of the cloud service 208 and the server 202), tenants can be migrated, as described in more detail below.

The tenant manager 211 can track, in tenant information 226, which database (e.g., a default database 228 or a scale database (e.g., scale database 230)) stores data for which tenants. As mentioned, tenants can be initially assigned to the default database 228 (which could be a set of default databases 228 in some instances), but can later be migrated to a scale database. Scale databases 230 can store data for one or more tenants. The default database 228 and the scale databases 230 can each include a discriminator column, to separate data for different tenants.

The tenant manager 211 can receive an indication to migrate at least one tenant to a scale database 230 and/or a scale process 212. For example, an administrator can determine that a migration should happen, and can use a migration tool 232 running on the administrator client device 205 to send a migration message to a migration trigger engine 234 of the cloud service 208. In some implementations, the migration message indicates which tenant(s) to migrate. The administrator can select tenants to migrate, for example, based on tenant processing and data usage. In other implementations, the migration message is an indication to the migration trigger engine 234 to determine which tenant(s) to migrate.

As another example, the migration trigger engine 234 can automatically determine, without interaction with an administrator, that a migration should occur, based upon detection of a migration condition. The migration trigger engine 234 can determine which tenant(s) to migrate, and to which scale databases 230 migrated tenants are to be assigned. In some implementations, the tenant manager 211 determines to which scale processes 212 a tenant is to be assigned. In other implementations, assignment to scale processes 212 is handled by another underlying component.

The migration trigger engine 234 can select a particular tenant as a tenant to migrate, based, for example, on data usage and/or a processing load for the tenant being more than an absolute or relative threshold. For example, a threshold maximum data amount for a given tenant may be five gigabytes (GB). The migration trigger engine 234 can determine which tenant(s) have data usage more than five GB, and select those tenants for migration. A relative threshold may be, for example, ten percent data usage for the tenant of data stored for all tenants in the default database 228. The migration trigger engine 234 can determine which tenant(s) use at least ten percent (10%) of the data for all tenants in the default database 228, and select those tenant(s) for migration. Similar determinations and selection of tenants for migration to scale processes 212 can be performed based on absolute or relative processing loads. A given tenant may be selected for database migration, process migration, or both database and process migration.

A determination to migrate one or more tenants can be based on an overall database size or overall processing load being more than a respective threshold. For example, a database size threshold for the default database 28 can be configured to be one hundred GB. The migration trigger engine 234 can determine that the overall size of the default database 228 is more than (or is approaching) one hundred GB, and can determine to migrate one or more tenants so that the overall size of the default database 228 is no longer greater than (or no longer approaching) one hundred GB. The tenant manager 211 can select one or more tenants to migrate to reduce the overall size of the default database 228. For example, the tenant manager 211 can continue to select a set of tenants that have the largest amounts of data stored in the default database 228 such that migrating each tenant in the set reduces the overall size of the default database 228 to an acceptable (e.g., target) size that is less than the database size threshold. In some implementations, one tenant (e.g., a tenant with the most data stored in the default database 228) is selected at a time to migrate, and if the overall database size is still too large after that tenant is migrated, another (e.g., next largest) tenant is selected for migration.

In some implementations, tenants are selected for migration that are determined to be a best fit for a scale database 230. For example, each scale database 230 can have a determined maximum size. The default database 228 may be becoming too large, so a determination to migrate one or more tenants may be made. The scale database 230 may have one GB of available space, and a tenant for which slightly less than one GB of data is stored in the default database 228 may be selected for migration to the scale database 228, to reduce the size of the default database 228 and to make best use of the available space in the scale database 228. As another example, a set of multiple tenants that collectively have one GB of data stored in the default database 228 can be selected for migration to the scale database 230. In some implementations, tenants are selected based at least in part on a predicted growth rate (e.g., a given tenant may be predicted to grow faster than other tenants, based on historical data, and therefore the given tenant may be selected for migration instead of another, larger tenant, based on a prediction that the given tenant will soon be larger than the other tenant). In general, the tenant manager 211 may perform various algorithms to select which tenant(s) to migrate and to which scale databases(s) to use as target databases.

The tenant manager 211 can determine to migrate a given tenant to a new scale database, such as if there is not sufficient space in existing scale database(s) or if data for the given tenant is large enough that the tenant manager 211 determines that data for the given tenant should be stored (at least initially) in a new, dedicated scale database. If a determination is made to migrate tenant(s) to new scale database(s), the new scale database(s) can be created before, or as part of, migration.

Once a given tenant has been selected for migration, a plausibility tester 236 can perform a first plausibility test to determine whether the tenant has already been migrated. For example, the plausibility tester 236 can determine whether data is already stored for the tenant in any existing scale databases 230.

If the tenant has not yet been migrated, the tenant manager 211 can select a migration algorithm to use to migrate the tenant. A migration message sent by an administrator may indicate which migration algorithm to use. For example, a first migration algorithm that involves less server processing but some tenant downtime can be selected. As another example, a second migration algorithm that involves more server processing but no client downtime can be selected. In some implementations, the tenant manager 211 automatically selects a particular algorithm, such as based on a set of rules that specify a maximum acceptable downtime.

For example, an estimated downtime that may occur if the first migration algorithm is used can be computed for a given tenant based on the amount of data stored for the tenant in the default database 228. If the estimated downtime is less than the maximum acceptable downtime, the tenant manager 211 can select the first migration algorithm to save server processing resources as compared to the use of the second migration algorithm. If the estimated downtime is more than the maximum acceptable downtime, the tenant manager 211 can select the second migration algorithm.

After the tenant manager 211 selects a migration algorithm, the tenant manager 211 can lock the tenant. For example, a tenant lock flag can be set in the tenant information 226. If the first migration algorithm has been selected, locking the tenant can include configuring the cloud service 208 to reject, while the tenant is locked, received client requests. Clients, such as the client application 222, can be configured to include a request queue 238 that holds requests that have been rejected by the cloud service 208. The server 202 can send a "service not available" type of message to reject a request received for a locked tenant. The server 202 can service other requests for other, unlocked tenants, while the tenant is locked. The cloud service 208 can be down from the perspective of the tenant, while the tenant is locked. The first migration algorithm is described in more detail below with respect to FIG. 4.

If the second migration algorithm has been selected, locking the tenant can include configuring a server queue 240 to hold client requests for the tenant that are received while the tenant is locked. If the second migration algorithm has been selected, a snapshot engine 242 can, before the tenant is locked, generate a snapshot of the data for the tenant. A difference engine 244 can generate one or more delta differences that reflect changes to the tenant data while the snapshot (or successive delta differences) are being calculated. Once a delta difference is below a certain threshold, the tenant manager 211 can lock the tenant. The second migration algorithm is described in more detail below with respect to FIG. 5.

After the tenant is locked, the tenant manager 211 can identify stateful components 214 for the tenant and serialize state information for the tenant from the identified stateful components 214. The tenant manager 211 can shut down the identified stateful components so that they do not generate any new state information for the tenant while the tenant is migrated. After the identified stateful component(s) 214 have been shut down, a data copier 246 can copy data for the tenant from the default database 228 to a selected scale database (e.g., the scale database 230). The plausibility tester 236 can perform a second plausibility test to determine whether all data for the tenant has been copied to the selected scale database. The tenant manager 211 can assign the tenant to the selected scale database, e.g., by updating an entry for the tenant in the tenant information 226. The tenant manager 211 can de-serialize the serialized state information and store the de-serialized state information in the selected scale database. The tenant manager can restart the identified stateful component(s) 214 (e.g., in a new scale process) and unlock the tenant.

If the second migration algorithm has been selected, the tenant manager 211 can process, after the tenant is unlocked, any requests that have been queued in the server queue 240. If the first migration algorithm has been selected, the client application 222 may determine (e.g., by polling or by receiving a message from the cloud service 208) that the cloud service 208 is now accessible to the client application 222 (e.g., the client application 222 can determine that the tenant is now unlocked). In response to determining that the tenant is now unlocked, the client application 222 can send queued requests to the server 202 that may be held in the request queue 238.

The tenant manager 211 can receive requests (e.g., either previously queued or newly generated requests) from the client application 222. A given request may be for or associated with data for the tenant. The tenant manager 211 can determine (e.g., from the tenant information 226) that the tenant is now assigned to the selected scale database. The tenant manager 211 can fulfil (or direct other component(s) to fulfil) the given request using the selected scale database.

As used in the present disclosure, the term "computer" is intended to encompass any suitable processing device. For example, although FIG. 2 illustrates a single server 202, a single end-user client device 204, and a single administrator client device 205, the system 200 can be implemented using a single, stand-alone computing device, two or more database systems 202, or multiple client devices. Indeed, the server 202 and the client devices 204 and 205 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 202 and the client devices 204 and 205 may be adapted to execute any operating system, including Linux, UNIX, Windows, Mac OS®, Java™, Android™, iOS or any other suitable operating system. According to one implementation, the server 202 may also include or be communicably coupled with an e-mail server, a Web server, a caching server, a streaming data server, and/or other suitable server.

Interfaces 250, 252, and 254 are used by the server 202, the end-user client device 204, and the administrator client device 205, respectively, for communicating with other systems in a distributed environment—including within the system 200—connected to the network 206. Generally, the interfaces 250, 252, and 254 each comprise logic encoded in software and/or hardware in a suitable combination and operable to communicate with the network 206. More specifically, the interfaces 250, 252, and 254 may each comprise software supporting one or more communication protocols associated with communications such that the network 206 or interface's hardware is operable to communicate physical signals within and outside of the illustrated system 200.

The server 202 includes one or more processors 256. Each processor 256 may be a central processing unit (CPU), a blade, an application specific integrated circuit (ASIC), a field-programmable gate array (FPGA), or another suitable component. Generally, each processor 256 executes instructions and manipulates data to perform the operations of the server 202. Specifically, each processor 256 executes the functionality required to receive and respond to requests from the end-user client device 204, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 2 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 202 includes memory 258. In some implementations, the server 202 includes multiple memories. The memory 258 may include any type of memory or database module and may take the form of volatile and/or non-volatile memory including, without limitation, magnetic media, optical media, random access memory (RAM), read-only memory (ROM), removable media, or any other suitable local or remote memory component. The memory 258 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 202.

The end-user client device 204 and the administrator client device 205 may each generally be any computing device operable to connect to or communicate with the server 202 via the network 206 using a wireline or wireless connection. In general, the end-user client device 204 and the administrator client device 205 each comprise an electronic computer device operable to receive, transmit, process, and store any appropriate data associated with the system 200 of FIG. 2. The end-user client device 204 and the administrator client device 205 can each include one or more client applications, including the client application 222 or the migration tool 232, respectively. A client application is any type of application that allows the end-user client device 204 or the administrator client device 205 to request and view content on a respective client device. In some implementations, a client application can use parameters, metadata, and other information received at launch to access a particular set of data from the server 202. In some instances, a client application may be an agent or client-side version of the one or more enterprise applications running on an enterprise server (not shown).

The client device 204 and the administrator client device 205 respectively include processor(s) 260 or processor(s) 262. Each processor 260 or 262 included in the end-user client device 204 or the administrator client device 205 may be a central processing unit (CPU), an application specific integrated circuit (ASIC), a field-programmable gate array (FPGA), or another suitable component. Generally, each processor 260 or 262 included in the end-user client device 204 or the administrator client device 205 executes instructions and manipulates data to perform the operations of the end-user client device 204 or the administrator client device 205, respectively. Specifically, each processor 260 or 262 included in the end-user client device 204 or the administrator client device 205 executes the functionality required to send requests to the server 202 and to receive and process responses from the server 202.

The end-user client device 204 and the administrator client device 205 are each generally intended to encompass any client computing device such as a laptop/notebook computer, wireless data port, smart phone, personal data assistant (PDA), tablet computing device, one or more processors within these devices, or any other suitable processing device. For example, the end-user client device 204 and/or the administrator client device 205 may comprise a computer that includes an input device, such as a keypad, touch screen, or other device that can accept user information, and an output device that conveys information associated with the operation of the server 202, or the respective client device itself, including digital data, visual information, or a graphical user interface (GUI) 264 or 266, respectively.

The GUIs 264 and 266 interface with at least a portion of the system 200 for any suitable purpose, including generating a visual representation of the client application 222 or the migration tool 232, respectively. In particular, the GUI 264 and/or the GUI 266 may be used to view and navigate various Web pages. Generally, the GUI 264 and the GUI 266 provide a respective user with an efficient and user-friendly presentation of business data provided by or communicated within the system. The GUI 264 and the GUI 266 may each comprise a plurality of customizable frames or views having interactive fields, pull-down lists, and buttons operated by the user. The GUI 264 and the GUI 266 each contemplate any suitable graphical user interface, such as a combination of a generic web browser, intelligent engine, and command line interface (CLI) that processes information and efficiently presents the results to the user visually.

Memory 268 and memory 270 included in the end-user client device 204 or the administrator client device 205, respectively, may each include any memory or database module and may take the form of volatile or non-volatile memory including, without limitation, magnetic media, optical media, random access memory (RAM), read-only memory (ROM), removable media, or any other suitable local or remote memory component. The memory 268 and the memory 270 may each store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the associated client device.

There may be any number of end-user client devices 204 and/or administrator client devices 205 associated with, or external to, the system 200. For example, while the illustrated system 200 includes one end-user client device 204, alternative implementations of the system 200 may include multiple end-user client devices 204 communicably coupled to the server 202 and/or the network 206, or any other number suitable to the purposes of the system 200. Additionally, there may also be one or more additional end-user client devices 204 external to the illustrated portion of system 200 that are capable of interacting with the system 200 via the network 206. Further, the term "client", "client device" and "user" may be used interchangeably as appropriate without departing from the scope of this disclosure. Moreover, while the end-user client device 204 and the administrator client device 205 may be described in terms of being used by a single user, this disclosure contemplates that many users may use one computer, or that one user may use multiple computers.

Figure 3:
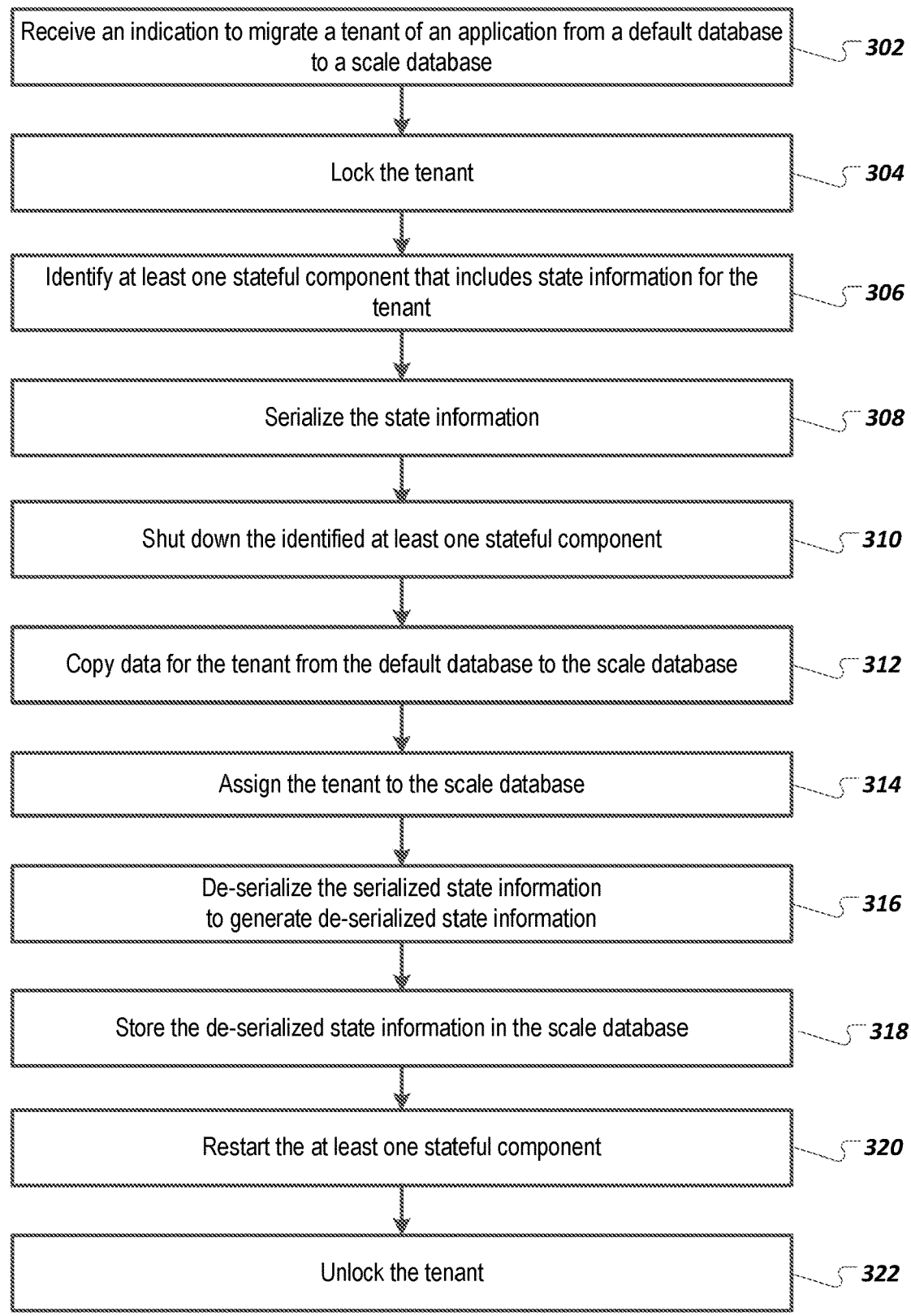
FIG. 3 is a flowchart of an example method for migrating a tenant to a new database.

FIG. 3 is a flowchart of an example method 300 for migrating a tenant to a new database. The method 300 is a broad illustration that covers aspects of more specific methods described in more detail below. It will be understood that method 300 and related methods may be performed, for example, by any suitable system, environment, software, and hardware, or a combination of systems, environments, software, and hardware, as appropriate. For example, one or more of a client, a server, or other computing device can be used to execute method 300 and related methods and obtain any data from the memory of a client, the server, or the other computing device. In some implementations, the method 300 and related methods are executed by one or more components of the system 200 described above with respect to FIG. 2. For example, the method 300 and related methods can be executed by the tenant manager 211 of FIG. 2.

At 302, an indication to migrate a tenant of an application from a default database to a scale database is received. The default database can store data for multiple tenants, including the tenant. The indication can be received, for example, from an administrator or an automated process. The administrator or the automated process can detect a migration condition that results in a determination to trigger migration for the tenant. The migration condition can include one or more of a total size of the default database exceeding (or approaching) a threshold maximum size, a percentage of the default database used for the tenant exceeding a threshold percentage, a total processing load of the application exceeding an application load threshold, a percent of the processing load used for the tenant exceeding a tenant load threshold, or a total number of tenants used for the application. An administrator can manually observe migration conditions and/or can set one or more parameters of the automated process such that migration condition(s) are automatically detected by the automated process.

The percent of the processing load can be a percent of load used by a given tenant among all tenants served by a default process. In some implementations, the indication (or another indication) indicates that the tenant is to be migrated from the default process to a scale process. The default process can be used for multiple tenants. Tenants can be initially assigned to the default process. Scale processes can be implemented as different threads than the default process, or run as different processes on different machines than the default process.

At 304, the tenant is locked. As described in more detail below, locking the tenant can include creating a queue to hold client requests for the tenant received while the tenant is locked. As another example, locking the tenant can include rejecting, after the tenant is locked and before the tenant is unlocked, requests for the tenant received from clients. The clients can be configured to queue rejected requests and to resend rejected requests after the tenant is unlocked. In some implementations, a first plausibility test is performed, before the tenant is locked, to determine whether the tenant has already been migrated. For example, one or more queries can be executed that determine whether data for the tenant already exists in the scale database. If the tenant has already been migrated, the method 300 can be terminated.

At 306, at least one stateful component that includes state information for the tenant is identified. A stateful component can include for example, a rule engine that includes time-sensitive state information.

At 308, the state information is serialized. For example, state information can be extracted from the rule engine (and/or from the default database) and stored in a serialized state information data structure.

At 310, the identified stateful component(s) are shut down. The stateful components that have been shut down can be prevented from generating new state information while in a shutdown state.

At 312, data for the tenant is copied from the default database to the scale database. In some implementations, the scale database is created as a new database, and data is copied from the default database to the new database. In some implementations, an existing database that includes data for other tenants can be identified as the scale database and data can be copied from the default database to existing database. The existing database (and the default database) can include a discriminator column used to identify a tenant for which data is stored. A second plausibility test can be performed. after the copying, to determine whether all data for the tenant has been copied to the scale database.

In some implementations, before the tenant is locked and while still serving requests for the tenant, a snapshot of the data for the tenant in the default database is created. At least one delta difference can be (potentially recursively) created that each reflect changes to the data for the tenant in the default database while the snapshot or a preceding delta difference was generated. Copying data for the tenant can involve copying the snapshot to the scale database. The at least one delta difference can be applied to the scale database the snapshot is copied to the scale database.

At 314, the tenant is assigned to the scale database. For example, an entry for the tenant can be identified in a tenant to database mapping table. A current value in the entry that identifies the default database can be changed to a new value that identifies the scale database.

At 316, the serialized state information is de-serialized to generate de-serialized state information.

At 318, the de-serialized state information is stored, for the tenant, in the scale database.

At 320, the stateful component(s) are re-started. If the tenant is being migrated to a new scale process, the stateful component(s) can be restarted in the new scale process.

At 322, the tenant is unlocked. If a queue has been created to store client requests received while the tenant has been locked, the queued client requests can be processed, after the tenant is unlocked. After the tenant has been unlocked, other requests for tenant data can be received from clients. For example, clients can generate requests after the tenant has been unlocked. As another example, if a client maintains a queue to hold rejected requests sent while the tenant was locked, the client can send client-queued requests after determining that the tenant is now unlocked (e.g., the client can poll to determine when the tenant is unlocked or can receive a notification that the tenant is unlocked). In response to a received request, a determination can be made (e.g., by querying the mapping table) to determine that the tenant is assigned to the scale database. The requested tenant data can be retrieved from the scale database and provided in response to the received request.

Figure 4:
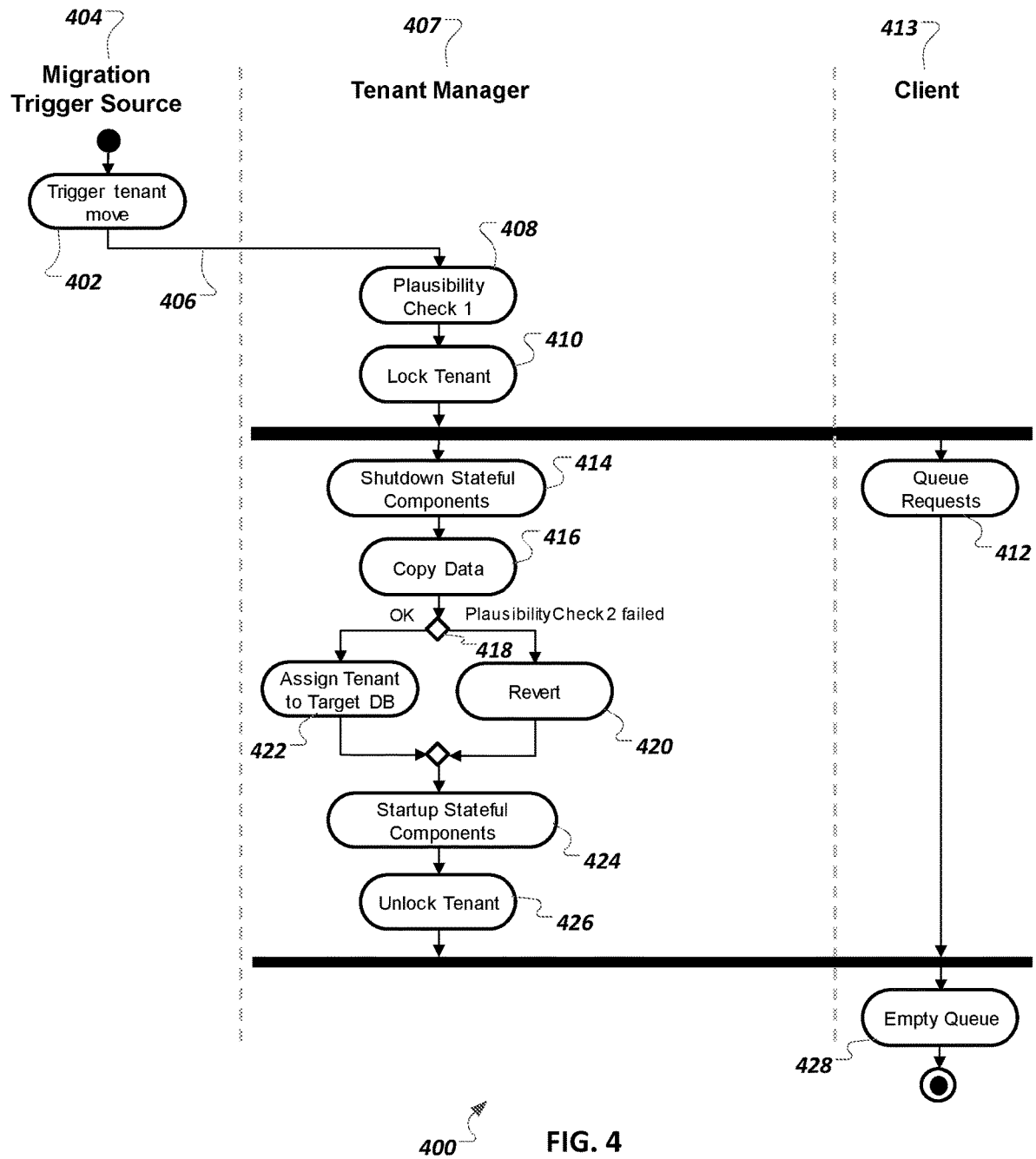
FIG. 4 is a swim lane of a first implementation of an example method for migrating a tenant to a new database.

FIG. 4 is a swim lane of a first implementation of an example method 400 for migrating a tenant to a new database. The method 400 may be used when application requests for an application are not time-sensitive and where a certain amount of client downtime is acceptable. Being able to have a certain amount of client downtime can result in less overhead and a more simplified approach, as compared to an approach below that does not involve client downtime.

It will be understood that method 400 and related methods may be performed, for example, by any suitable system, environment, software, and hardware, or a combination of systems, environments, software, and hardware, as appropriate. For example, one or more of a client, a server, or other computing device can be used to execute method 400 and related methods and obtain any data from the memory of a client, the server, or the other computing device. In some implementations, the method 400 and related methods are executed by one or more components of the system 200 described above with respect to FIG. 2. For example, the method 400 and related methods can be executed by the tenant manager 211 of FIG. 2.

At 402, a migration-trigger source 404 triggers a tenant move for a particular tenant that uses, for example, a cloud service. The migration-trigger source 404, can be, for example, an administrator. As another example, the migration-trigger source 404 can be an automated process. The migration-trigger source 404 can send a message 406 to a tenant manager 407 to trigger a tenant migration for a tenant.

At 408, the tenant manager 407 performs a first plausibility check. The first plausibility check can include, for example, determining whether the tenant already has data in a target (e.g., scale) database. A target database can be, for example, an existing scale database that has data for one or more other tenants. As another example, the target database can be a new database (which does not have any tenant data). If the first plausibility check fails (e.g., due to the target database already including data for the tenant), the method 400 can be aborted. An error message (not shown) can be provided to the move trigger source 404, as notification of the aborting.

At 410, if the first plausibility check succeeded, the tenant manager 407 locks the tenant. For example, the tenant manager 407 can maintain a lock flag per tenant in a tenant information database. While the tenant is locked, application requests received for the tenant can be blocked, e.g., by responding to the requests, for example, with a HTTP 503 Service Unavailable response message. Locking the tenant can ensure that changes to tenant data do not occur during migration. The cloud service remains available for other, unlocked tenants.

At 412, after the tenant has been locked, a client 413 can queue application requests. The client 412 can be configured, for example, to place a request in a queue in response to receiving a service unavailable response message. The client 412 can be configured to send the queued requests at a later time, after the tenant is unlocked.

At 414, the tenant manager 407 shuts down stateful components. For example, a stateful component may be associated with a production rule engine that uses timed events. For proper execution of the stateful component, a production rule engine can be paused during migration and resumed when the migration has completed.

At 416, the tenant manager 407 copies data from a source (e.g., existing) database for the tenant to the target database. The tenant manager 407 can, for example, copy entities without foreign key relations first, followed by entities that have foreign key relations. In some implementations, At 418, the tenant manager 407 performs a second plausibility check. The second plausibility check can be performed to determine whether tenant data for the tenant in the source database is the same as tenant data for the tenant in the target database. Different types of checks can be performed. For example, the second plausibility check can include comparing entity counts, checksums, and doing spot checks for certain (e.g., random) records to test for data equality. As another example, a more thorough comparison can be performed that includes iterating through all (or more of) the individual entities, to determine whether each entity in the source database matches a corresponding entity in the target database. A type of check to perform can be selected based on a desired maximum client downtime, for example.

If the second plausibility check fails, the tenant manager 407, at 420, reverts the migration. Reverting the migration can include deleting tenant data for the tenant from the target database. In some implementations, the tenant remains locked pending an investigation by an administrator. As another example, the tenant may be automatically made available (and unlocked) while staying assigned to the source database.

If the second plausibility check succeeds, the tenant manager 407 assigns, at 422, the tenant to a target database. The target database is used for the tenant for future requests (e.g., until a possible future migration for the tenant). Upon successful migration, tenant data for the tenant can be automatically deleted from the source database. As another example, tenant data for the tenant can remain in the tenant database until a future point in time. For example, a predetermined delay period (e.g., four hours, ten days) can be configured, such that tenant data for the tenant is automatically deleted from the source database after the delay period elapses. Data deletion can be delayed, for example, to allow for time to test the operation of the application while assigned to the target database. As another example, tenant data for the tenant can be maintained in the source database indefinitely, e.g., until an administrator manually deletes the tenant data (e.g., after being convinced that the application is running successfully with the target database).

At 424, the tenant manager starts up stateful components. For example, production rule engines that had been previously paused can be restarted.

At 426, the tenant manager 407 unlocks the tenant. For example, the tenant manager 407 can reset a lock flag for the tenant to indicate that the tenant is now unlocked.

At 428, the client 413 empties the queue. The client 413 can be notified (e.g., by the tenant manager 407) that the tenant is unlocked. Queued requests can be sent by the client to, for example, the cloud service, in the order that the requests were placed into the queue. The cloud service can process the received requests, and, for requests for tenant data, can access the tenant data for the tenant in the target database.

Figure 5:
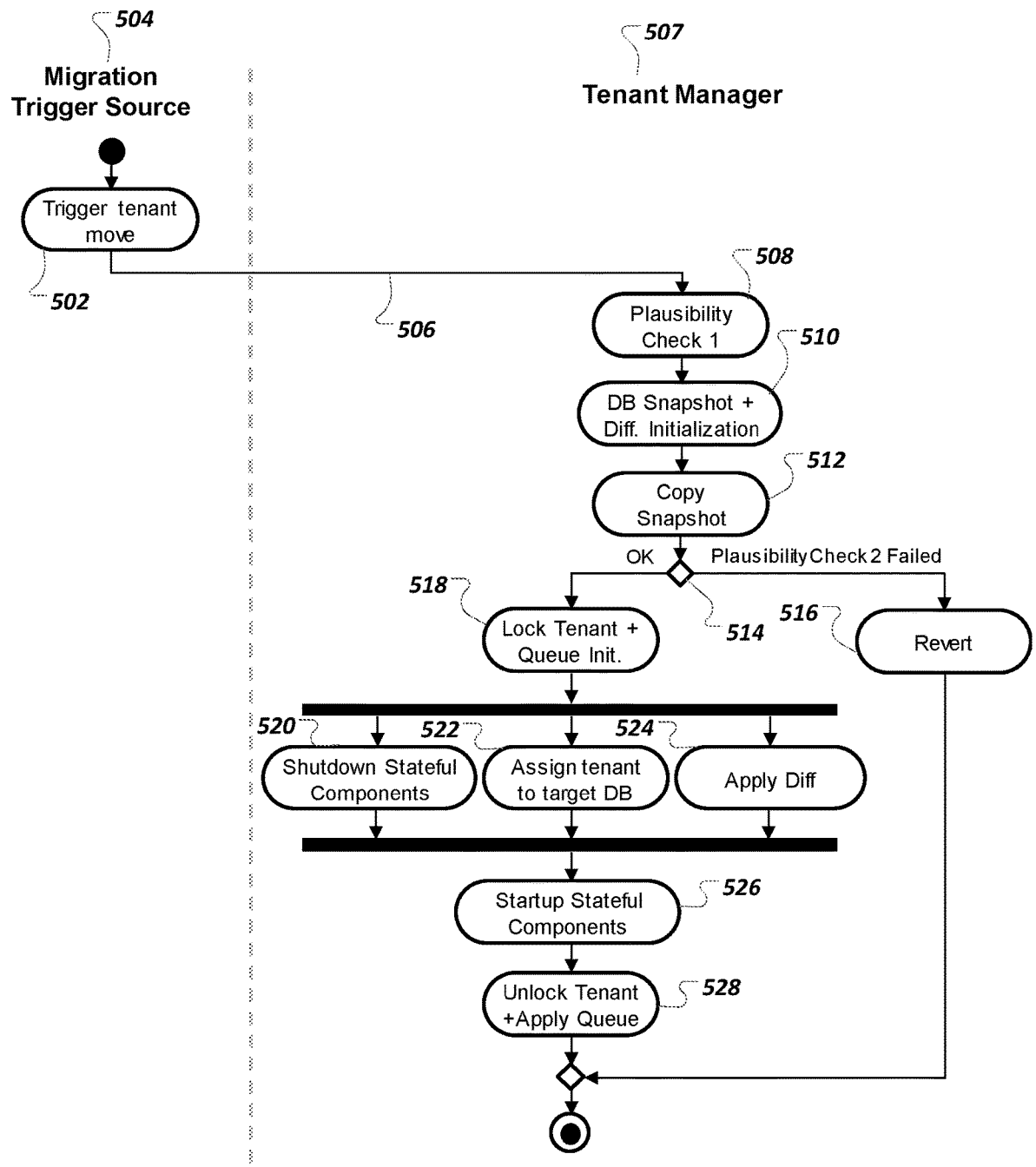
FIG. 5 is a swim lane of a second implementation of an example method for migrating a tenant to a new database.

FIG. 5 is a swim lane of a second implementation of an example method 500 for migrating a tenant to a new database. The method 500 can be used when client downtime is unacceptable or undesired, for example. Server processing cost for the method 500 may be more expensive than for the method 400, which involves client downtime.

It will be understood that method 500 and related methods may be performed, for example, by any suitable system, environment, software, and hardware, or a combination of systems, environments, software, and hardware, as appropriate. For example, one or more of a client, a server, or other computing device can be used to execute method 500 and related methods and obtain any data from the memory of a client, the server, or the other computing device. In some implementations, the method 500 and related methods are executed by one or more components of the system 200 described above with respect to FIG. 2. For example, the method 500 and related methods can be executed by the tenant manager 211 of FIG. 2.

At 502, a migration-trigger source 504 triggers a tenant move for a particular tenant that uses, for example, a cloud service. The migration-trigger source 504, can be, for example, an administrator. As another example, the migration-trigger source 504 can be an automated process. The migration-rigger source 504 can send a message 506 to a tenant manager 507 to trigger a tenant migration for a tenant.

At 508, the tenant manager 507 performs a first plausibility check. The first plausibility check can include, for example, determining whether the tenant already has data in a target (e.g., scale) database. A target database can be, for example, an existing scale database that has data for one or more other tenants. As another example, the target database can be a new database (which does not have any tenant data). If the first plausibility check fails (e.g., due to the target database already including data for the tenant), the method 500 can be aborted. An error message (not shown) can be provided to the move trigger source 504, as notification of the aborting.

At 510, the tenant manager 507 creates a database snapshot and performs a difference initialization. The difference initialization can include initializing data structure(s) for difference calculation and transfer, which is described below. The database snapshot includes a current state of the source database as frozen at a particular point in time.

At 512, the tenant manager 507 copies the database snapshot to the target database. Data for the tenant in the source database can be modified while the database snapshot is being copied, since the tenant is unlocked and available while the database snapshot is being copied. If the tenant data has changed since the database snapshot was copied to the target database, a delta difference can be determined that reflects differences between the database snapshot and the current state of the tenant data in the default database.

A determination can be made as to whether transferring the delta difference will take more or less than an acceptable delay. The acceptable delay can be an acceptable amount of delay (e.g., one half second) that the cloud service may incur while transferring a last amount of delta difference data to the target database while the cloud service is briefly locked. The acceptable amount of delay can be an amount of delay during which clients won't discern that the cloud service is offline.

If a determination has been made that transferring the delta difference will take more than the acceptable delay, the delta difference is transferred to the source database while the tenant is unlocked (e.g., the cloud service remains available for the tenant). A recursive delta difference process can be invoked to determine other delta differences, and to determine whether the other delta differences can be transferred within a time period less than the acceptable delay. The recursive process can continue until a stopping condition is reached, with the stopping condition being a determination that a last delta difference can be transferred in less time than the acceptable delay.

As a specific example, assume that the acceptable delay is one half second, and that copying the database snapshot takes one hour. A first delta difference is created that reflects changes made for the tenant to the default database while the database snapshot was being copied. A determination is made that copying the first delta difference may take one minute, which is more than the acceptable delay. The first delta difference is copied to the target database. A second delta difference is calculated. A determination is made that copying the second delta difference may take less than one half second. The stopping condition is reached, and the second delta difference is held in storage as a difference to be applied later after the tenant is locked.

At 514, the tenant manager 507 performs a second plausibility check. The second plausibility check can be performed to determine whether tenant data for the tenant in the database snapshot (and possibly transferred delta difference(s)) is the same as tenant data for the tenant that has been copied to the target database. Different types of checks can be performed. For example, the second plausibility check can include comparing entity counts, checksums, and doing spot checks for certain (e.g., random) records to test for data equality. As another example, a more thorough comparison can be performed that includes iterating through all (or more of) the individual entities, to determine whether each entity in the database snapshot matches a corresponding entity in the target database.

If the second plausibility check fails, the tenant manager 507, at 516, reverts the migration. Reverting the migration can include deleting tenant data for the tenant from the target database. In some implementations, the tenant can be locked pending an investigation by an administrator. As another example, the tenant may be remain available (and unlocked) while staying assigned to the source database.

If the second plausibility check succeeds, the tenant manager 507, at 518, locks the tenant and performs queue initialization. Because the database snapshot (and possibly delta difference(s)) have already been copied to the target database, the amount of time that the tenant may be locked may be short enough (e.g., a fraction of a second) as to not be noticeable by clients (e.g., from client perspectives, the cloud service remains available). The tenant manager 507 can initialize a queue (e.g., a server-side queue) that will temporarily hold incoming client requests. The incoming requests that are received after the tenant has been locked can be held in the queue until the migration has finished. Unlike for the method 400, clients do not need to maintain a queue. Clients are not aware that a migration is being performed.

At 520, the tenant manager 507 shuts down stateful components. For example, a stateful component may be associated with a production rule engine that uses timed events. For proper execution of the stateful component, a production rule engine can be paused during migration and resumed when the migration has completed.

At 522, the tenant manager 507 assigns the tenant to a target database. The target database is used for the tenant for queued and future requests (e.g., until a possible future migration for the tenant).

At 524, the tenant manager applies a remaining delta difference (if any) that has yet to be copied. As described above, a remaining delta difference can be copied in less time than the predetermined acceptable delay. In some implementations, some or all of the steps 520, 522, and 523 can be performed in parallel.

At 526, the tenant manager starts up stateful components. For example, production rule engines that had been previously paused can be restarted.

At 528, the tenant manager unlocks the tenant and applies the queue. Requests included in the queue can be processed, with requests for tenant data being fulfilled using the target database, rather than the source database.

As described above for the method 400, upon successful migration, tenant data for the tenant can be automatically deleted from the source database. As another example, tenant data for the tenant can remain in the tenant database until a future point in time. For example, a predetermined delay period (e.g., four hours, ten days) can be configured, such that tenant data for the tenant is automatically deleted from the source database after the delay period elapses. Data deletion can be delayed, for example, to allow for time to test the operation of the application while assigned to the target database. As another example, tenant data for the tenant can be maintained in the source database indefinitely, e.g., until an administrator manually deletes the tenant data (e.g., after being convinced that the application is running successfully with the target database).

The preceding figures and accompanying description illustrate example processes and computer-implementable techniques. But system 200 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method comprising:
   receiving an indication to migrate a tenant of an application from a default database to a scale database;
   locking the tenant;
   identifying at least one stateful component that includes state information for the tenant;
   serializing the state information;
   shutting down the identified at least one stateful component;
   copying data for the tenant from the default database to the scale database;
   assigning the tenant to the scale database;
   de-serializing the serialized state information to generate de-serialized state information;
   storing the de-serialized state information in the scale database;
   restarting the at least one stateful component; and
   unlocking the tenant.

2. The method of claim 1, wherein the indication is received from an administrator.

3. The method of claim 1, wherein the indication is received from an automated process.

4. The method of claim 3, wherein the automated process is configured to provide the indication upon satisfaction of a migration condition.

5. The method of claim 4, wherein the migration condition includes at least one of a total size of the default database, a percentage of the default database used for the tenant, a total processing load of the application, a percent of the processing load used for the tenant, or a total number of tenants.

6. The method of claim 5, wherein the existing database includes a discriminator column used to distinguish data for the tenant from data for the other tenants.

7. The method of claim 1, further comprising creating the scale database as a new database, wherein copying data from the default database to the scale database comprises copying data from the default database to the new database.

8. The method of claim 1, further comprising identifying the scale database as an existing database that includes data for other tenants, wherein copying data from the default database to the scale database comprises copying data from the default database to the existing database.

9. The method of claim 1, further comprising migrating the tenant from a default process to a scale process.

10. The method of claim 9, wherein the stateful components are restarted in the scale process.

11. The method of claim 1, further comprising performing, before the locking, a first plausibility test to determine whether the tenant has already been migrated.

12. The method of claim 1, further comprising performing, after the copying, a second plausibility test to determine whether all data for the tenant has been copied to the scale database.

13. The method of claim 1, wherein locking the tenant comprises creating a queue to hold client requests for the tenant received while the tenant is locked, the method further comprising processing, after the tenant is unlocked, queued client requests for the tenant.

14. The method of claim 1, wherein locking the tenant comprises rejecting, after locking the tenant and before unlocking the tenant, requests for the tenant received from clients, wherein the clients are configured to queue rejected requests and to resend rejected requests after the tenant is unlocked.

15. The method of claim 1, further comprising:
   receiving, after the tenant is unlocked, a request for tenant data associated with the tenant;
   determining that the tenant is assigned to the scale database;
   retrieving the requested tenant data from the scale database; and
   sending a response to the request for tenant data, the response including the retrieved requested tenant data.

16. The method of claim 1, further comprising:
   creating, before the tenant is locked and while still serving requests for the tenant, a snapshot of the data for the tenant in the default database;
   creating at least one delta difference that reflects changes to the data for the tenant in the default database while the snapshot or a preceding delta difference was generated; and
   applying the at least one delta difference to the scale database after copying data for the tenant, wherein copying data for the tenant comprises copying the snapshot to the scale database.

17. A system comprising:
   one or more computers; and
   a computer-readable medium coupled to the one or more computers having instructions stored thereon which, when executed by the one or more computers, cause the one or more computers to perform operations comprising:
     receiving an indication to migrate a tenant of an application from a default database to a scale database;
     locking the tenant;
     identifying at least one stateful component that includes state information for the tenant;
     serializing the state information;
     shutting down the identified at least one stateful component;
     copying data for the tenant from the default database to the scale database;
     assigning the tenant to the scale database;
     de-serializing the serialized state information to generate de-serialized state information;
     storing the de-serialized state information in the scale database;

restarting the at least one stateful component; and
unlocking the tenant.

18. The system of claim 17, wherein the indication is received from an automated process.

19. A computer program product encoded on a non-transitory storage medium, the product comprising non-transitory, computer readable instructions for causing one or more processors to perform operations comprising:
   receiving an indication to migrate a tenant of an application from a default database to a scale database;
   locking the tenant;
   identifying at least one stateful component that includes state information for the tenant;
   serializing the state information;
   shutting down the identified at least one stateful component;
   copying data for the tenant from the default database to the scale database;
   assigning the tenant to the scale database;
   de-serializing the serialized state information to generate de-serialized state information;
   storing the de-serialized state information in the scale database;
   restarting the at least one stateful component; and
   unlocking the tenant.

20. The computer program product of claim 19, wherein the indication is received from an automated process.

* * * * *